United States Patent
Fukunaga et al.

(10) Patent No.: US 8,659,469 B2
(45) Date of Patent: Feb. 25, 2014

(54) MOVABLE INFORMATION COLLECTION APPARATUS

(75) Inventors: Tetsuo Fukunaga, Tokyo (JP); Akio Oniyama, Machida (JP); Hiroyuki Okada, Yokohama (JP); Shuhei Hikosaka, Yokohama (JP); Yuzuru Matsui, Yokohama (JP)

(73) Assignee: Pasco Corporation, Tokyo (JP)

( * ) Notice: Subject to any disclaimer, the term of this patent is extended or adjusted under 35 U.S.C. 154(b) by 24 days.

(21) Appl. No.: 13/321,525

(22) PCT Filed: May 28, 2010

(86) PCT No.: PCT/JP2010/059112
§ 371 (c)(1),
(2), (4) Date: Nov. 18, 2011

(87) PCT Pub. No.: WO2010/137697
PCT Pub. Date: Dec. 2, 2010

(65) Prior Publication Data
US 2012/0062412 A1    Mar. 15, 2012

(30) Foreign Application Priority Data
May 29, 2009  (JP) .................................. 2009-130225

(51) Int. Cl.
*G01S 13/89* (2006.01)
(52) U.S. Cl.
USPC ............................................ 342/64; 342/175
(58) Field of Classification Search
USPC ................................................ 342/25 A, 64
See application file for complete search history.

(56) References Cited

U.S. PATENT DOCUMENTS

| 5,124,915 A | 6/1992 | Krenzel |
| 6,084,510 A | 7/2000 | Lemelson et al. |
| 6,466,156 B1 * | 10/2002 | Ulander ...................... 342/25 R |
| 6,674,391 B2 * | 1/2004 | Ruszkowski, Jr. .......... 342/25 R |
| 7,027,653 B2 * | 4/2006 | Hino et al. .................... 382/218 |

(Continued)

FOREIGN PATENT DOCUMENTS

| CN | 101228412 A | 7/2008 |
| DE | 3843043 A1 | 6/1990 |

(Continued)

OTHER PUBLICATIONS

ISA Japan, International Search Report of PCT/JP2010/059112, Jun. 29, 2010, WIPO, 2 pages.

(Continued)

*Primary Examiner* — Matthew M Barker
(74) *Attorney, Agent, or Firm* — Alleman Hall McCoy Russell & Tuttle LLP

(57) ABSTRACT

An object of the present invention is to provide a movable information collection apparatus capable of grasping the current situation in a timely fashion. Also, an object of the present invention is to provide a geographical monitoring system capable of utilizing the movable information collection apparatus. The movable information collection apparatus includes an observation data collection antenna system that receives observation data obtained by observing an observation target area from the air, a geographic information database that stores previously acquired geographic information in the observation target area, an evaluation calculation unit that calculates and outputs a difference between the observation data and the previously acquired geographic information, the observation data collection antenna system, the geographic information database, and the evaluation calculation unit being mounted on a movable pedestal.

2 Claims, 4 Drawing Sheets

(56) References Cited

U.S. PATENT DOCUMENTS

| | | | |
|---|---|---|---|
| 7,528,938 B2 * | 5/2009 | Garceau et al. | 356/4.01 |
| 7,603,208 B2 * | 10/2009 | Garceau et al. | 701/3 |
| 7,898,458 B2 * | 3/2011 | Shibayama et al. | 342/25 A |
| 8,138,960 B2 * | 3/2012 | Nonaka et al. | 342/25 A |
| 2007/0124064 A1 * | 5/2007 | Fukui et al. | 701/208 |
| 2007/0162194 A1 * | 7/2007 | Garceau et al. | 701/3 |
| 2008/0158256 A1 * | 7/2008 | Russell et al. | 345/629 |

FOREIGN PATENT DOCUMENTS

| | | | |
|---|---|---|---|
| ES | 2133239 A1 | 9/1999 |
| JP | 08271647 A | 10/1996 |
| JP | 09010345 A | 1/1997 |
| JP | 2004252733 A | 9/2004 |
| JP | 2008046107 A | 2/2008 |

OTHER PUBLICATIONS

ISA European Patent Office, Extended European Search Report of EP10780651, Oct. 5, 2012, Netherlands, 9 pages.

State Intellectual Property Office of People's Republic of China, First Office Action of CN2010800165875, Sep. 5, 2012, China, 7 pages.

* cited by examiner

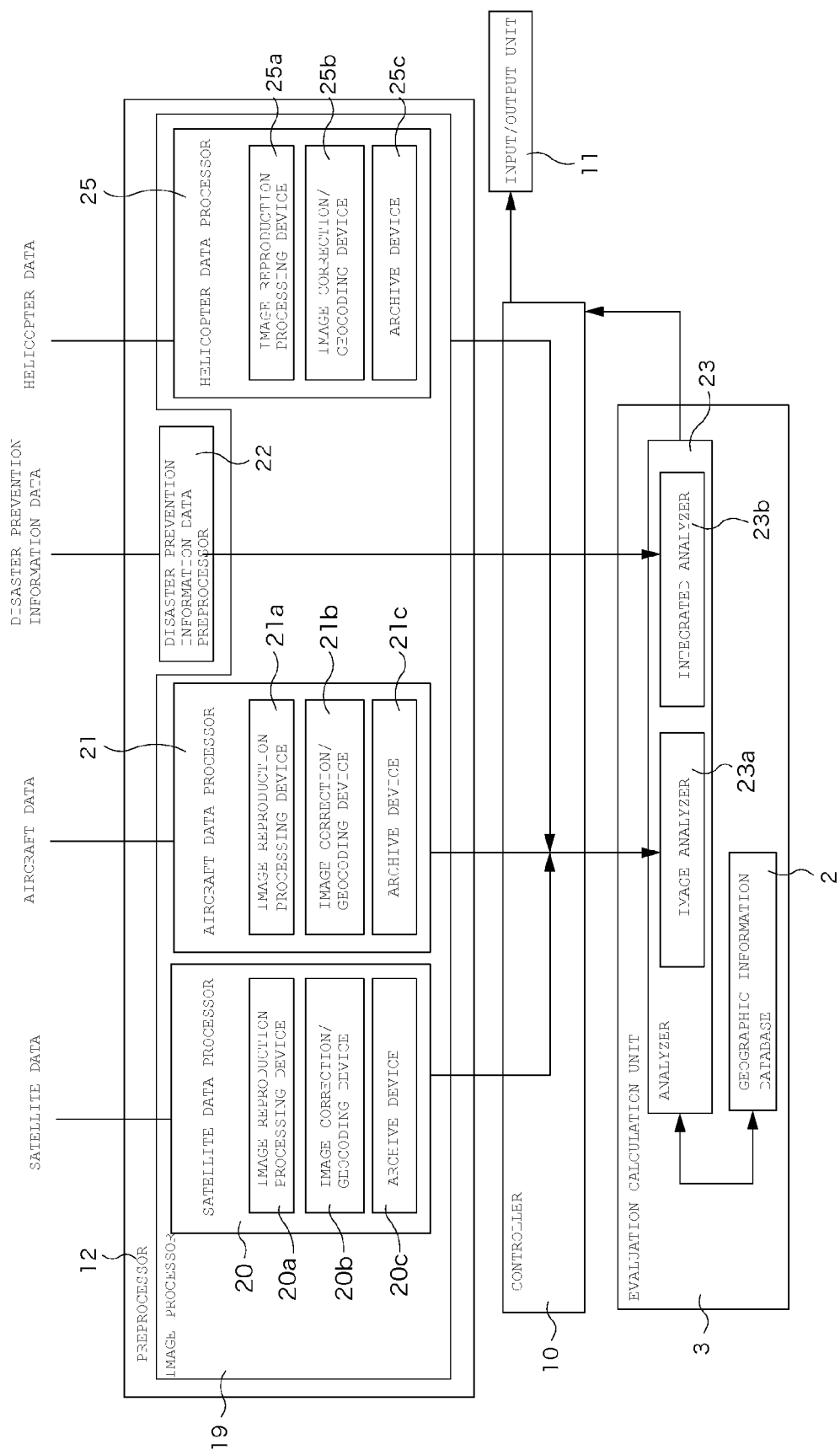

MOVABLE INFORMATION COLLECTION APPARATUS

TECHNICAL FIELD

The present invention relates to a movable information collection apparatus.

BACKGROUND ART

An apparatus described in Patent Document 1 is known as an apparatus for carrying out, in the event of a disaster or the like, information collection or analysis or the like at the site of the disaster. In the conventional example, the information collection apparatus includes an information base pack dispatched to a disaster site, a disaster prevention center that communicates with the information base pack via a communications satellite, and a radio base station.

The information base pack is equipped with an information display means such as a projector or a large-sized screen, means for loading pictures captured by a hand-held camera or the like, and an information server. As described in the sixteenth paragraph of Patent Document 1, various data transmitted from the disaster prevention center is accumulated in the information server, and is displayed on the large-sized screen or the like in conjunction with data acquired by the hand-held camera or the like.

PRIOR ART DOCUMENT

Patent Document

Patent Document 1: Japanese Patent Application Publication No. H9-10345

SUMMARY OF THE INVENTION

Problems to be Solved by the Invention

However, the above-described conventional example is configured such that original data for display is acquired by the disaster prevention center established outside the actual location and is transmitted to the information base pack. For this reason, the above-described conventional example has a disadvantage that, the apparatus cannot exert its satisfactory function if communications are not in desirable condition at the actual location, for example.

Above all, if information on a disaster area or the like is acquired from an earth observation satellite, the amount of data is large, which in turn leads to a decrease in processing speed as a whole, and hence to the disadvantage of being unable to perform timely observations or the like, taking into account the situation of the actual location.

The present invention has been made to eliminate, at least in part, the foregoing disadvantages. An object of the present invention is to provide a movable information collection apparatus capable of grasping the current situation in a timely fashion.

Also, another object of the present invention is to provide a geographical monitoring system capable of utilizing the movable information collection apparatus.

Means for Solving the Problem

According to the present invention, the above object is achieved by providing a movable information collection apparatus including an observation data collection antenna system 1 that receives observation data obtained by observing an observation target area from the air, a geographic information database 2 that stores previously acquired geographic information in the observation target area, an evaluation calculation unit 3 that extracts a change in the observation data from the previously acquired geographic information, and outputs change element data, the observation data collection antenna system 1, the geographic information database 2, and the evaluation calculation unit 3 being mounted on a movable pedestal 4.

A movable information collection apparatus A is formed by mounting, on the movable pedestal 4, the observation data collection antenna system 1, the geographic information database 2, and the evaluation calculation unit 3. In the event of a natural disaster for example, the apparatus A can be transported to the site of the disaster or an area in the vicinity of the site. The movable pedestal 4 may be of a self-propelled type having a power source 4$a$, or may be of a type that is towed by an appropriate traction vehicle.

Observation data obtained by observation of the current situation from the air, performed on the site to which the movable information collection apparatus A is dispatched, is received directly by the observation data collection antenna system 1, rather than via a fixed monitor station B such as a disaster prevention center, and is outputted to the evaluation calculation unit 3. The evaluation calculation unit 3 can perform a change extraction process on the observation data, calculate a change element relative to previously acquired geographic information prepared beforehand, and output the change element in an appropriate format.

Incidentally, here, the change element may refer to a difference between data sets, or may refer merely to coordinate information on a region in which there is a change between the data sets, or refer to the like, and the change element may be appropriately determined according to the circumstances. Also, the previously acquired geographic information may also include statistical information for a given time period in the past, besides information at a point in time in the past.

Therefore, in the present invention, direct receipt of the observation data and data processing can be performed in the site to which the movable information collection apparatus A is dispatched, and at least, the calculated change element data can be displayed on a display device 9, or detailed data on various geographical variation factors, such as studies of the possibility of a slope collapse or a collapse of a natural dam formed, can be acquired based on the change element data. Further, as a result of this, required coping such as planning of detailed observation or planning of relief supply carrying-in route in disaster situations, can be quickly made based on the data.

Also, input/output level, format or the like of data between constituent portions such as the observation data collection antenna system 1 and the evaluation calculation unit 3 are controlled by a controller 10 or the like, and the movable information collection apparatus A is adjusted so as to be operable as a whole, and thus, sufficient data collection can be performed without operators for only the constituent portions being arranged in the constituent portions.

Further, the movable information collection apparatus A is equipped with the evaluation calculation unit 3 that generates the change element data from the observation data, and thus, results of information collection can be reported to the fixed monitor station B such as the disaster prevention center, by using the change element data. The change element data is smaller in capacity as compared to the observation data. Thus, even if communication infrastructure between the area to which the movable information collection apparatus A is dispatched and the fixed monitor station B is poor, data having an amount of information equivalent to the observation data can be quickly transmitted to the fixed monitor station B, by using the change element data. Accordingly, a material useful for a general measure meeting or the like in the fixed monitor station B can be provided with reliability.

The observation data collection antenna system 1 can be configured so that it can receive mid-range observation data transmitted from an aircraft 6 or narrow range observation data transmitted from a helicopter 7, in addition to receipt of wide range observation data on the observation target area transmitted from an earth observation satellite 5. In this case, a difference occurrence region is automatically detected based on the wide range observation data which contains information on the wide range and is obtained by the earth observation satellite 5, although inferior in resolution. After that, the difference occurrence region is subjected to difference calculation using the mid-range or narrow-range observation data of high resolution and is displayed, and thereby, an improvement in working efficiency in addition to accuracy can be achieved.

Further, the movable information collection apparatus A is equipped with a satellite control unit 8 thereby to enable acquiring the wide range observation data according to a plan, and the plan is used in combination with a flight plan of the aircraft 6 or the like thereby to enable independently complete observation operation on the site, and thus, even if information infrastructure with the fixed monitor station B and the like is completely broken, plans and the like for observation or measures can be drafted.

Also, the movable information collection apparatus A having an information collection and analysis function can be utilized to build a geographical monitoring system. The geographical monitoring system includes: a movable information collection apparatus A movable to an observation target area; and a fixed monitor station B communicable with the movable information collection apparatus A, wherein the movable information collection apparatus A is formed to be capable of receiving observation data on the observation target area from the air and capable of converting the observation data into predetermined evaluation data, and the fixed monitor station B is formed to be capable of monitoring geographical variations in the observation target area, based on the evaluation data transmitted from the movable information collection apparatus A.

At the occurrence of a disaster or the like, the movable information collection apparatus A is dispatched to the site of the disaster or an area near the site, and transmits information acquired in the area to which it is dispatched, to the fixed monitor station B as the disaster prevention center. The movable information collection apparatus A is equipped with a device capable of receiving the observation data on the observation target area from the air over the observation target area and capable of converting the observation data into the predetermined evaluation data, and a report to the fixed monitor station B is performed by outputting the evaluation data obtained by adding some calculation to the observation data as raw data.

The evaluation data is dramatically small in capacity as compared to the raw observation data, and thus, even if a communication line with the fixed monitor station B is weak, the current situation can be quickly transmitted.

The evaluation data may employ all data types that are at least small in capacity compared to the observation data, such as lossless compressed data, or such lossy (irreversible) compressed data as to be evaluated by the fixed monitor station B. In particular, difference data between the observation data and the previously acquired geographic information, or the difference data subjected to a compression process is employed as the evaluation data, and thereby, after receipt of the evaluation data by the fixed monitor station B, a geographical variation state can be immediately observed.

Also, the evaluation data may contain various indices of a current situation derived from the observation data, for example indices such as the extent of the risk of a collapse of a natural dam formed, the time of the collapse, or the extent of the risk of a slope collapse.

Further, when the movable information collection apparatus A can be remotely controlled by the fixed monitor station B, the observation data can be acquired while giving commands to an operator without expertise as well as operations requiring expertise by remote process control, and thus, necessary information can be acquired without an expert in information processing or the like. In this case, in the fixed monitor station B, the expert can perform remote control using the change element data.

Effect of the Invention

According to the present invention, the movable information collection apparatus A can perform collection and processing of the observation data on the site to which it is dispatched, thus timely grasping the current situation at the occurrence of a disaster or the like.

BRIEF DESCRIPTION OF THE DRAWINGS

FIG. 4 is a chart showing a processing procedure for observation data.

MODE FOR CARRYING OUT THE INVENTION

Figure 1:
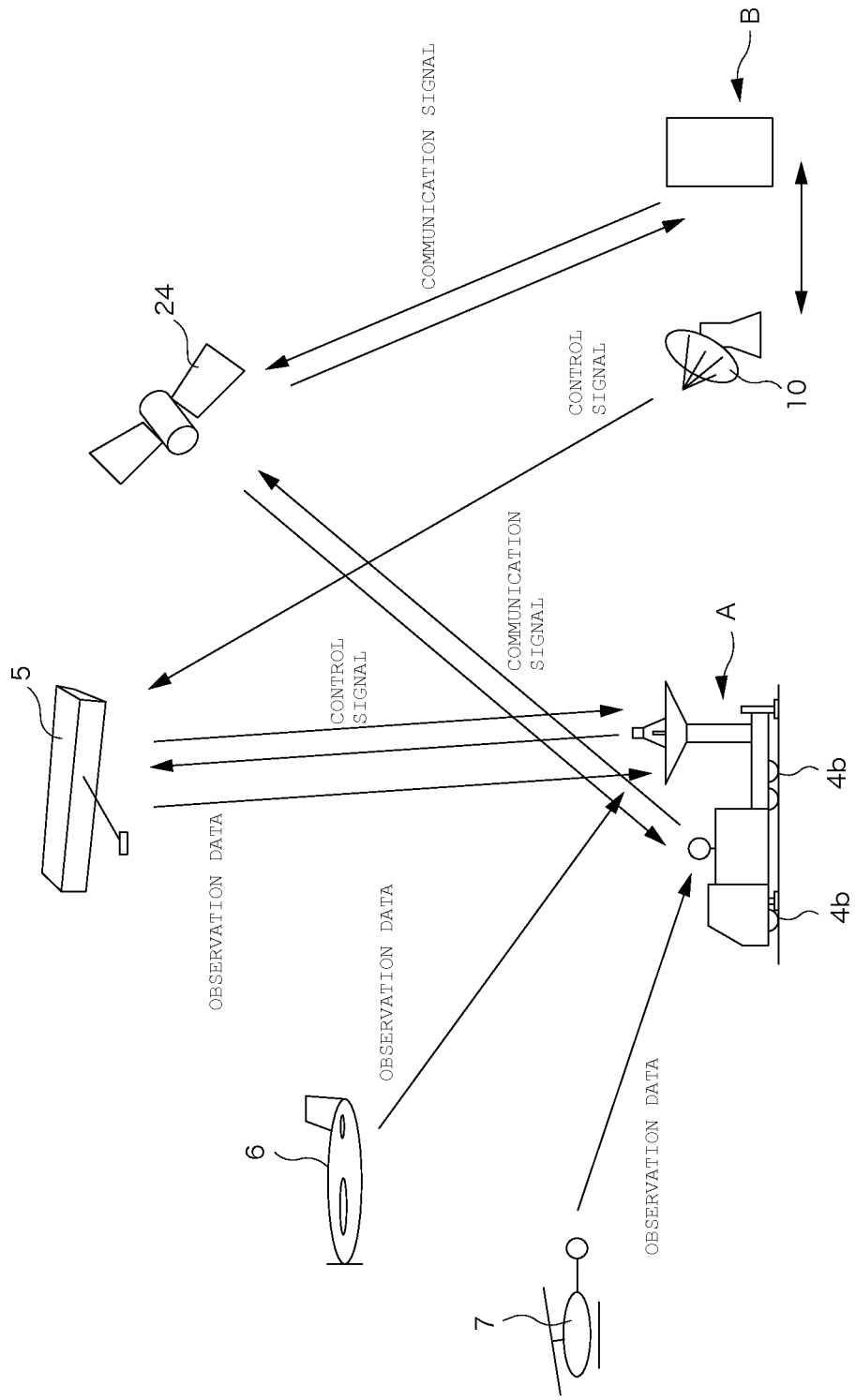
FIG. 1 is a diagram of a system configuration of a geographical monitoring system.

As shown in FIG. 1, a geographical monitoring system includes a fixed monitor station B that functions as a disaster prevention center, and a movable information collection apparatus A dispatched to an actual spot or a location near the actual spot in the event of an emergency such as a disaster. The fixed monitor station B is connected to a fixed station side antenna system 10 that uses a frequency band in an S-band to uplink a control signal to an earth observation satellite 5. An uplink from the fixed monitor station B is available, for example, for such preparation that a picture-taking request is completed while the movable information collection apparatus A moves to the actual spot, and the movable information collection apparatus A can acquire observation data from the earth observation satellite 5 as soon as the apparatus A reaches the actual spot.

Also, the fixed monitor station B is provided with a display device that displays the following database and so on, and further, processing software for difference data (or change element data) to be described later, in addition to a database that stores geographic information such as data of GIS mounted in the movable information collection apparatus A, basic data for simulation, and the like, various simulation software packages for a landslide or the like, and so on.

Incidentally, these components are not shown in FIG. 1, because of being substantially the same as those mounted in the movable information collection apparatus A.

Figure 2:
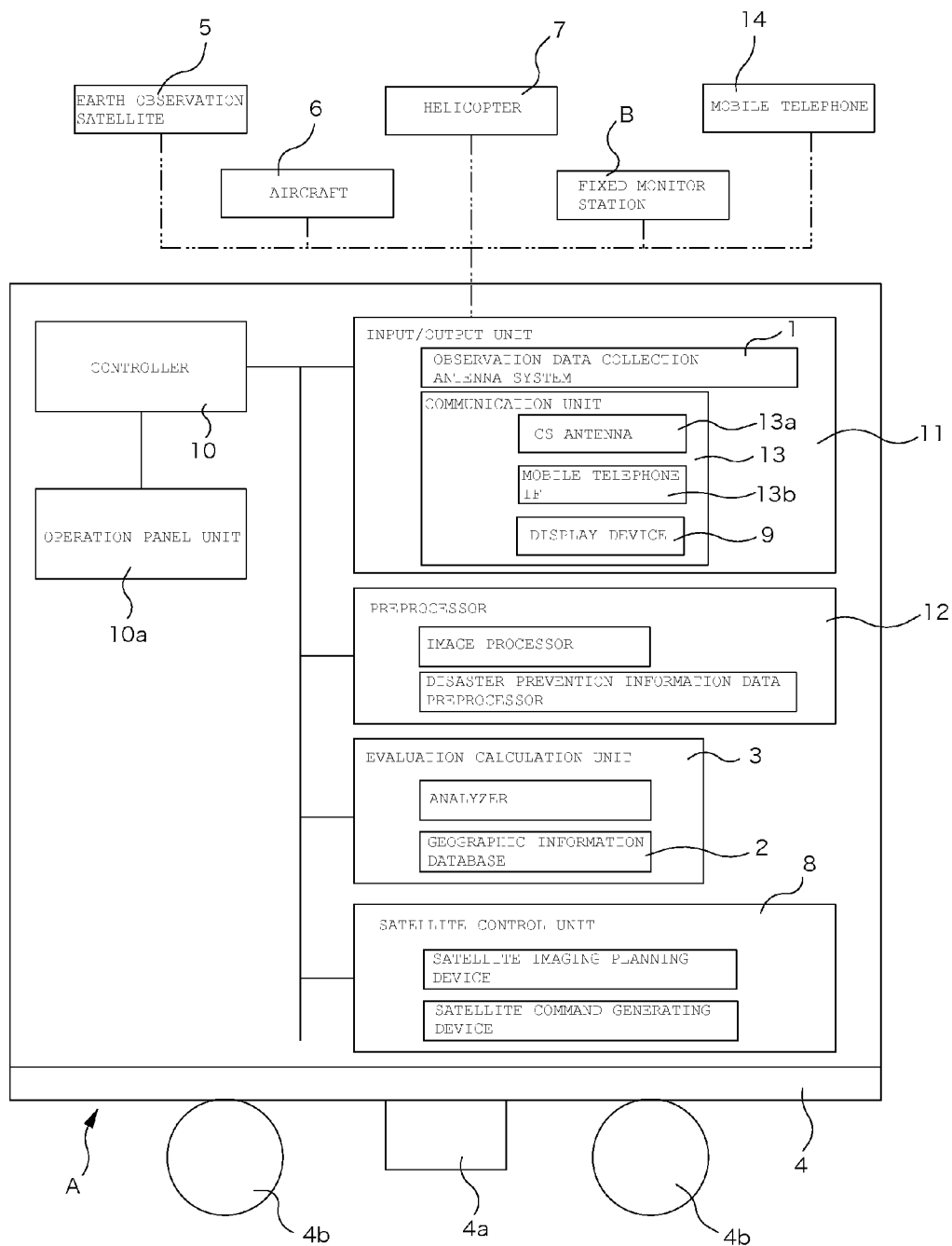
FIG. 2 is a block diagram of a movable information collection apparatus.

As shown in FIG. 2, the movable information collection apparatus A includes an input/output unit 11, a preprocessor 12, an evaluation calculation unit 3, a satellite control unit 8, and a controller 10 to control these, which are mounted on a movable pedestal 4 including wheels 4b or the like so as to be transportable to a disaster spot or the like, and each of the units are operated by an operator under a command to an operation panel 10a connected to the controller 10. In this embodiment, the movable pedestal 4 is of a self-advancing type including a power source 4a such as an engine, and the overall weight and dimensions and the like are designed so that the apparatus can travel on a general road.

The input/output unit 11 includes an observation data collection antenna system 1 and a communication unit 13. The observation data collection antenna system 1 receives observation data from the earth observation satellite 5, aircraft 6, and a helicopter 7. The communication unit 13 includes a CS antenna 13a for a stationary communications satellite (CS) 24 for communication with the fixed monitor station B, a mobile telephone IF 13b for enabling communications from outside the movable information collection apparatus A via a mobile telephone 14, and a display device 9 to provide display of results of the calculation by the evaluation calculation unit 3 to the operator.

Figure 3:
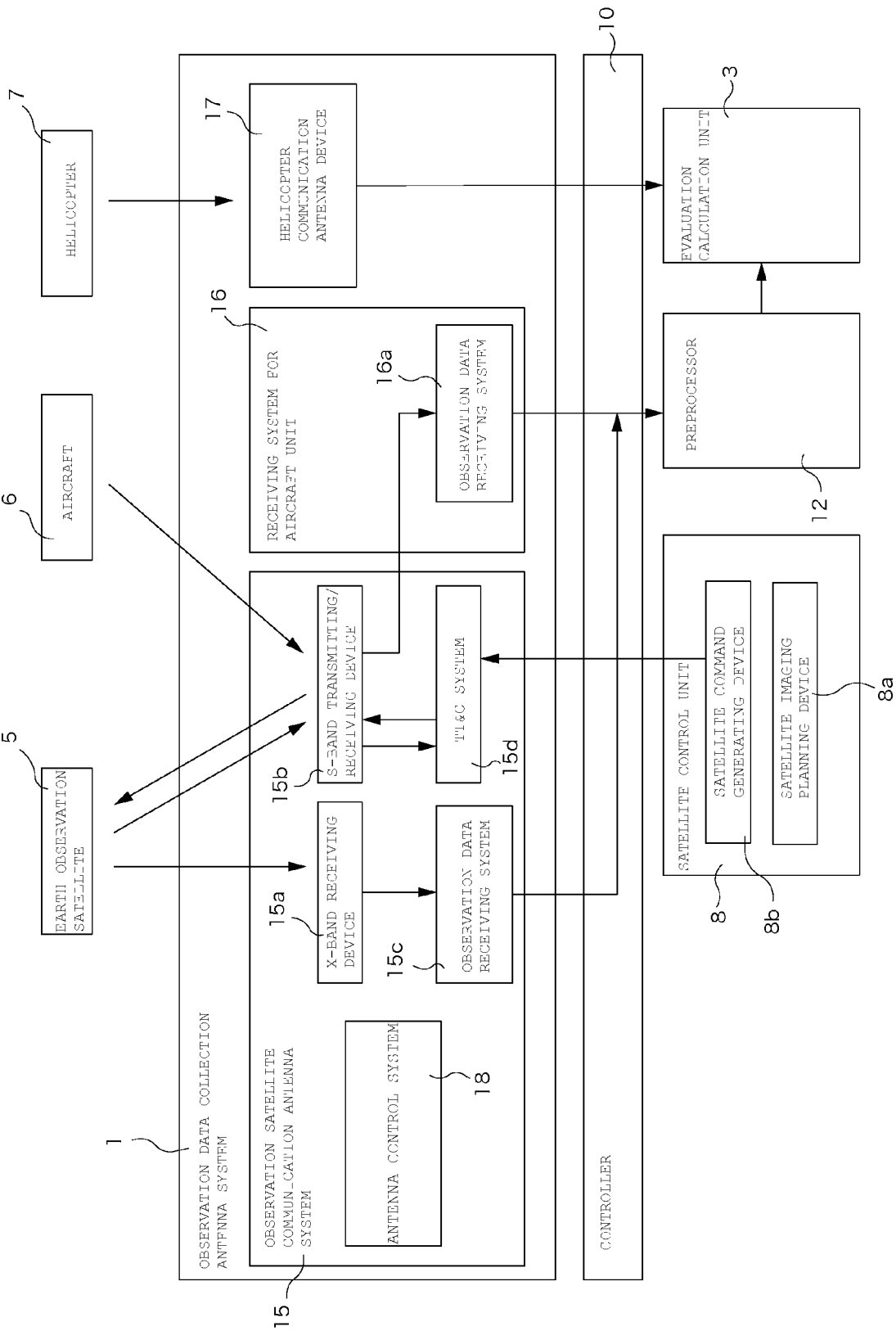
FIG. 3 is a block diagram of an observation data collection antenna system.

As shown in FIG. 3, an observation data collection antenna system 1 includes an antenna system 15 for communication with the observation satellite, a receiving system 16 for the aircraft, and an antenna device 17 for communication with the helicopter. The antenna system 15 for communication with the observation satellite includes an X-band receiving device 15a and an S-band transmitting/receiving device 15b. The X-band receiving device 15a is capable of automatic tracking of the earth observation satellite 5 based on a signal from the earth observation satellite 5 or capable of tracking of the earth observation satellite 5 based on satellite orbit prediction data, by an antenna control system 18, and receives observation data (or mission data) from the earth observation satellite 5. The S-band transmitting/receiving device 15b transmits and receives an operation management signal for the earth observation satellite 5.

The X-band receiving device 15a includes an antenna, a feed, a low noise amplifier (LNA), and a down converter, and observation data from the earth observation satellite 5 received by the X-band receiving device 15a is demodulated from an analog signal into a digital signal by an observation data receiving system 15c, and is then subjected to frame synchronization and error correction, and thereby, image data is taken out. When generation of the image data is posted to the controller 10, the controller 10 starts processing of the generated image data by the preprocessor 12.

Meanwhile, the S-band transmitting/receiving device 15b includes a high power amplifier (HPA), a low noise amplifier (LNA), an up converter, and a down converter, and receives telemetry data indicative of the status of equipment mounted on the earth observation satellite 5 and further outputs a tele command as an observation command signal for the equipment.

Also, the antenna system 15 for communication with the observation satellite is equipped with a TT&C system 15d to process the telemetry data and a telemetry tracking command, and the telemetry data containing HK (House Keeping) data on the position or the like of the earth observation satellite 5 is demodulated from an analog signal into a digital signal by the TT&C system 15d and is outputted.

Also, control of the earth observation satellite 5 with the telemetry tracking command is performed by the operator giving a command for a satellite imaging planning device 8a of the satellite control unit 8. When an imaging region of interest is specified on a map or coordinates displayed on an operation screen provided on the operation panel 10a, setting of an imaging range containing the imaging region of interest is performed, and an imaging time and an incident angle are calculated for the set imaging range, based on the orbit prediction data of the earth observation satellite 5. A satellite command generating device 8b of the satellite control unit 8 generates a command signal based on an output from the satellite imaging planning device 8a, and upon receipt of a signal indicative of generation of the command signal, the controller 10 gives a command to output the command signal to the TT&C system 15d. Upon receipt of the command signal, the TT&C system 15d modulates the command signal from a digital signal into an analog signal, and outputs the signal to the S-band transmitting/receiving device 15b.

Meanwhile, the observation data from the aircraft 6 is received by the S-band transmitting/receiving device 15b of the antenna system 15 for communication with the observation satellite, and thereafter, the observation data is demodulated from an analog signal into a digital signal or otherwise processed by an observation data receiving system 16a of the receiving system 16 for the aircraft. Image data generated by the observation data receiving system 16a is outputted to the preprocessor 12 under control of the controller 10.

Incidentally, in the above description, communication with the aircraft 6 is performed in the S-band. However, a Ka band or a Ku band may be used.

Further, in this embodiment, collection of observation data by the helicopter 7 is performed using a heli-tele system, and the observation data from the helicopter 7 is received by the antenna device 17 for communication with the helicopter and is transmitted to the evaluation calculation unit 3. The observation data acquired by the earth observation satellite 5 is wide-range observation data, and the observation data acquired by the aircraft 6 is mid-range observation data, while the observation data acquired by the helicopter 7 can be a narrow-range and high-resolution image, and may be adapted for real-time distribution of a moving picture, as needed.

The movable information collection apparatus A is equipped with communication means needed to give a command to change the imaging area or do the like to the aircraft 6 or the helicopter 7 flying according to a predetermined imaging plan, in order that an observation region of interest can be specified for the earth observation satellite 5.

As described above, the observation data from the earth observation satellite 5, the observation data from the aircraft 6 and the observation data from the helicopter 7 collected by the observation data collection antenna system 1 are subjected to required processing by the preprocessor 12, and thereafter, the data are outputted to the evaluation unit.

As shown in FIG. 4, the preprocessor 12 includes an image processor 19 for satellite data, aircraft data, and helicopter data, and after processing by the image processor 19, evaluation is performed by the evaluation calculation unit 3. The image processor 19 includes data processors 20, 21 and 25 for the satellite data, the aircraft data, and the helicopter data. The observation data transmitted to the data processors 20, 21 and 25 is converted into an image data format by image reproduction processing device 20a, 21a and 25a, and thereafter, the data is subjected to image radiometric correction, geometric correction and mapping by image correction/geocoding devices 20b, 21b and 25b. The processed images are subjected to compression into a predetermined format, image merging, or the like by archive devices 20c, 21c and 25c. Incidentally, conversion of image data format may be performed as needed.

Further, the preprocessor 12 includes a disaster prevention information data preprocessor 22, forms disaster induction information such as weather information or river information transmitted from the fixed monitor station B or the like into a predetermined evaluation format, and outputs the information to the evaluation calculation unit 3.

The evaluation calculation unit 3 includes an analyzer 23, and a geographic information database 2 that stores a previously acquired satellite image, an aircraft image, a helicopter image, digital elevation model (DEM) data, a map, and various GIS data in a hierarchy. An earth observation satellite image or the aircraft image inputted to the evaluation calculation unit 3 is compared to corresponding data in the geographic information database 2, in the state of the image or in the state of the DEM generated from the image, by an image analyzer 23a of the analyzer 23, and thereby, differences between new and old data sets are calculated. The extracted difference data is displayed on the display device 9 of the input/output unit 11, is subjected to verification, narrowing of a difference occurrence region, or the like by an operator or the like, and thereafter is used as the final result.

Incidentally, besides the display device 9, the operation panel unit 10a, the evaluation calculation unit 3 or the like may be provided with a monitor to display the difference data.

For the difference extraction process (or the change extraction process), if there are new and old wide-range data sets obtained by the earth observation satellite 5, improvements in processing efficiency and accuracy can be achieved by, first, automatically extracting a difference between wide-range data sets, and then, determining a difference between mid-range data sets of higher resolution obtained by the aircraft 6, in an extracted portion.

Difference data generated in the above-described manner is utilized as an evaluation object as it is, or is further analyzed by an integrated analyzer 23b thereby to generate analysis data required for disaster prevention. For example, the integrated analyzer 23b sees severed road conditions and generates data to determine a relief supplies carrying-in route, taking into account data or the like from the disaster prevention information data preprocessor 22. Alternatively, if many natural dams are formed at the same time due to an earthquake or the like, a time or the like before a collapse of the natural dams, the risk of the collapse of the natural dams, and further, damage to a downstream area at the time of the collapse are assumed by using topographical data or rainfall data in a basin, in locations where the natural dams are formed, and thereby, data useful to determine the priority or the like of evacuation orders or measures for prevention of the collapse of the natural dams is outputted.

Besides the above, the integrated analyzer 23b may produce various outputs according to the circumstances, and for example, the integrated analyzer 23b may also be configured so that on the site of a big fire occurring, a place where fire spreading can be efficiently blocked by fire extinguishing activities is determined by a combination of a fire occurring area and land use data, thereby to output decision-making reference data for prioritization of areas where the fire extinguishing activities are to be performed.

Data acquired by the integrated analyzer 23b or difference data is transmitted to the fixed monitor station B via the communication unit 13 and a stationary communications satellite 24, and is utilized to grasp the current situation, take measures, or do the like, using facilities installed in the fixed monitor station B, as described above.

Incidentally, description has been given above with regard to an instance where, in the movable information collection apparatus A, information collection operation is performed by the operator operating the controller 10. However, a remote desktop function that operates by a command from the fixed monitor station B or the mobile telephone may be incorporated into the controller 10 thereby to completely remotely control the movable information collection apparatus A, or perform information collection activities utilizing an operator not having a special knowledge as an assistant.

EXPLANATION OF REFERENCE NUMERALS

1 OBSERVATION DATA COLLECTION ANTENNA SYSTEM
2 GEOGRAPHIC INFORMATION DATABASE
3 EVALUATION CALCULATION UNIT
4 MOVABLE PEDESTAL
5 EARTH OBSERVATION SATELLITE
6 AIRCRAFT
7 HELICOPTER
8 SATELLITE CONTROL UNIT
A MOVABLE INFORMATION COLLECTION APPARATUS
B FIXED MONITOR STATION

The invention claimed is:

1. A movable information collection apparatus, comprising:
an observation data collection antenna system that receives observation data obtained by observing an observation target area from the air, wherein the observation data collection antenna system is formed to be capable of receiving wide-range observation data on the observation target area transmitted from an earth observation satellite, and mid-range or narrow-range observation data on a region in the observation target area transmitted from an aircraft or a helicopter;
a preprocessor that includes a disaster prevention information preprocessor configured to receive disaster induction information data and to output disaster prevention information data;
a geographic information database that stores previously acquired geographic information in the observation target area, wherein the previously acquired geographic information contains previously acquired wide-range observation data, and previously acquired mid-range or narrow-range observation data;
an evaluation calculation unit that extracts a change in the observation data from the previously acquired geographic information, and outputs change element data, wherein the evaluation calculation unit includes an analyzer comprising an image analyzer and an integrated analyzer, where the image analyzer is configured to receive image data and further configured to output difference data, and the integrated analyzer is configured to receive difference data and the disaster prevention information data and further configured to output at least one of analysis data and decision making reference data, and wherein the evaluation calculation unit is capable of wide-range automatic difference extraction by comparison of the wide-range observation data, and mid-range or narrow-range automatic difference extraction by comparison of the mid-range or narrow-range observation data; and
the observation data collection antenna system, the preprocessor, the geographic information database, and the evaluation calculation unit being mounted on a movable pedestal that includes a power source to propel said pedestal.

2. The movable information collection apparatus according to claim 1, comprising a satellite control unit that performs observation control on the earth observation satellite.

\* \* \* \* \*